United States Patent
Ender

(10) Patent No.: US 11,077,506 B2
(45) Date of Patent: Aug. 3, 2021

(54) TRANSPORTABLE MACHINING UNIT, STRUCTURE AND STACK ARRANGEMENT

(71) Applicant: Festool GmbH, Wendlingen (DE)

(72) Inventor: Dominic Richard Ender, Nürtingen (DE)

(73) Assignee: FESTOOL GMBH, Wendlingen (DE)

( * ) Notice: Subject to any disclaimer, the term of this patent is extended or adjusted under 35 U.S.C. 154(b) by 0 days.

(21) Appl. No.: 16/339,504

(22) PCT Filed: Oct. 5, 2016

(86) PCT No.: PCT/EP2016/073740
§ 371 (c)(1),
(2) Date: Apr. 4, 2019

(87) PCT Pub. No.: WO2018/065041
PCT Pub. Date: Apr. 12, 2018

(65) Prior Publication Data
US 2020/0047265 A1    Feb. 13, 2020

(51) Int. Cl.
*B23D 47/02* (2006.01)

(52) U.S. Cl.
CPC .................. *B23D 47/025* (2013.01)

(58) Field of Classification Search
CPC ............................ B23D 47/025; B25H 3/02
See application file for complete search history.

(56) References Cited

U.S. PATENT DOCUMENTS

| 4,613,847 A * | 9/1986 | Scolari ..................... B60Q 7/00 |
| | | 116/63 C |
| 5,722,473 A * | 3/1998 | Tucker ................. B23D 47/025 |
| | | 144/286.1 |
| 7,752,699 B1 | 7/2010 | Fruzzetti, Jr. et al. |

(Continued)

FOREIGN PATENT DOCUMENTS

| CN | 104922833 A * | 9/2015 |
| CN | 205470370 U | 8/2016 |

(Continued)

OTHER PUBLICATIONS

International Search Report issued in International Application No. PCT/EP2016/073740 with English translation, dated Jun. 16, 2017 (10 pages).

(Continued)

*Primary Examiner* — Stephen Choi
(74) *Attorney, Agent, or Firm* — Flynn Thiel, P.C.

(57) ABSTRACT

A transportable machining unit for machining a workpiece with a tool including a box-shaped support structure placed on a support and having a workpiece support plate used to support the workpiece and a drive unit for mechanically driving the tool, arranged at least partially in the support structure and fastened thereto ready for operation so that the drive unit remains at least partially in the support structure during machining of the workpiece by the tool driven by the drive unit. The support structure has supporting arms which define a footprint of the support structure and which can be positioned selectively in a transport or working position. The footprint of the support structure is larger in the working position in at least one horizontal direction than in the transport position.

25 Claims, 8 Drawing Sheets

(56) References Cited

U.S. PATENT DOCUMENTS

| | | | |
|---|---|---|---|
| 8,875,888 B2 | 11/2014 | Koenig et al. | |
| 9,403,224 B1* | 8/2016 | Silva | B23D 47/025 |
| 2005/0093258 A1 | 5/2005 | Brazell et al. | |
| 2011/0155613 A1 | 6/2011 | Koenig et al. | |
| 2013/0092005 A1* | 4/2013 | Wiker | B25H 1/04 |
| | | | 83/477 |
| 2014/0060279 A1* | 3/2014 | Fuchs | B27B 17/005 |
| | | | 83/794 |
| 2015/0298860 A1* | 10/2015 | Kulich | B65D 25/20 |
| | | | 220/260 |

FOREIGN PATENT DOCUMENTS

| | | |
|---|---|---|
| DE | 202004009123 U1 | 10/2004 |
| DE | 102008034273 A1 | 1/2010 |
| DE | 202014010031 U1 | 2/2015 |
| EP | 0890534 A1 | 1/1999 |
| EP | 1516703 A1 | 3/2005 |
| EP | 2277651 A2 | 1/2011 |
| EP | 2315701 A1 | 5/2011 |
| JP | 58-15187 U | 1/1983 |
| JP | 61-154635 U | 9/1986 |
| JP | 2000176902 A | 6/2000 |
| JP | 2005-131785 A | 5/2005 |
| JP | 2010-115795 A | 5/2010 |
| JP | 2011-36952 A | 2/2011 |
| JP | 3174100 U | 3/2012 |
| SU | 956362 A * | 9/1982 |
| WO | 2011000385 A1 | 1/2011 |

OTHER PUBLICATIONS

Written Opinion of International Searching Authority issued in International Application No. PCT/EP2016/073740 dated Jun. 16, 2017 (18 pages).

Japanese Office Action, with English translation, issued in corresponding Japanese Patent Application No. 2019-518201 (16 pages).

Chinese Office Action issued in corresponding Chinese Application No. 201680089906.2, dated Mar. 19, 2020 (10 pages).

* cited by examiner

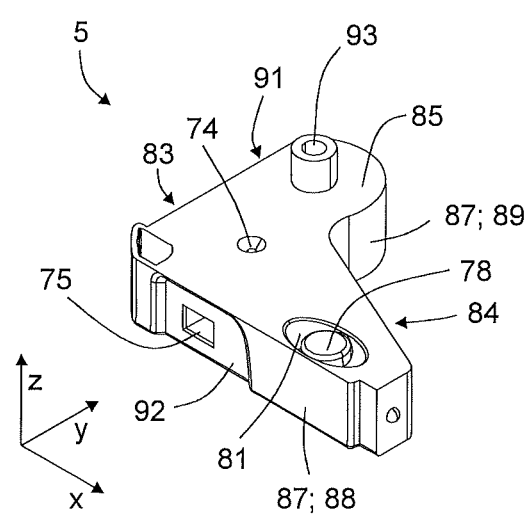
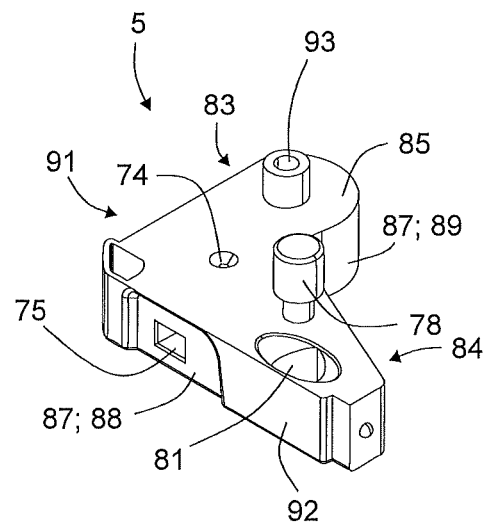
Fig. 3              Fig. 4
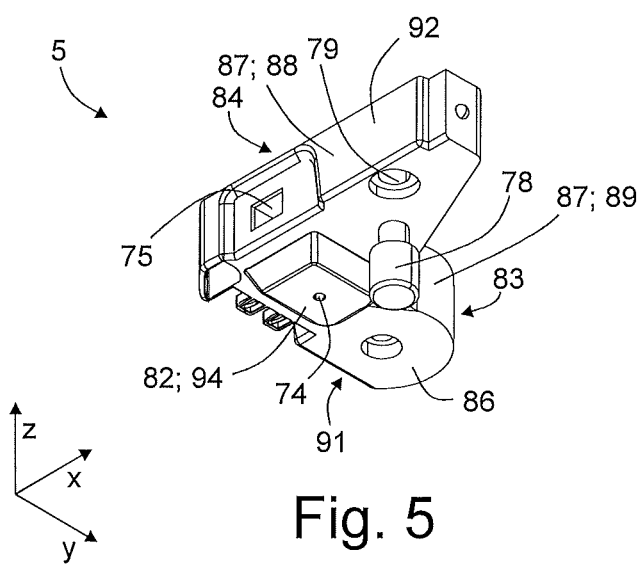
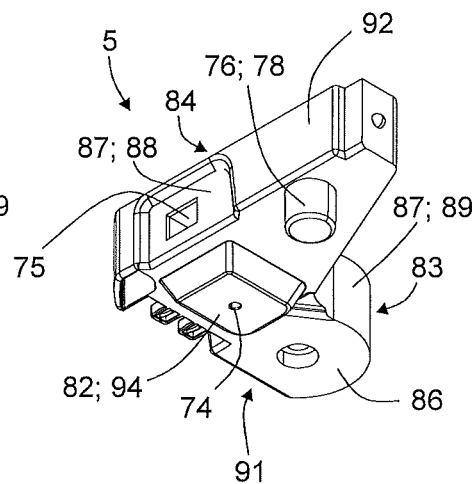
Fig. 5              Fig. 6

TRANSPORTABLE MACHINING UNIT, STRUCTURE AND STACK ARRANGEMENT

The invention relates to a transportable machining unit, in particular a circular table saw, for machining a workpiece with a tool, comprising a box-shaped support structure which can be placed on a support and which has a workpiece support plate which can be used to support the workpiece to be machined, as well as a drive device for mechanically driving the tool, which drive device is arranged at least partially in the support structure and is fastened thereto ready for operation, so that the drive device remains at least partially in the support structure when the workpiece is machined by the tool driven by the drive device.

DE 20 2004 009 123 U1 describes a circular table saw with a housing which is provided with essentially closed outer surfaces on the circumference and underside. The housing carries a worktop with a supporting surface. A machine frame for holding a motor and a saw blade is located below the worktop. The footprint of the circular table saw is defined by the lower outer surface of the housing.

One object of the invention is to improve the operational reliability of a transportable machining unit of the type mentioned above.

According to the invention, the support structure has support arms which, in a state in which the support structure is placed on the support, define a footprint of the support structure and which can be positioned selectively in a transport position or in a working position, wherein the footprint of the support structure is larger in the working position than in the transport position in at least one horizontal direction.

According to the invention, several support arms are provided, each of which can be put into two different positions—the transport position and the working position. In the working position of the support arms, the footprint of the support structure is increased in at least one horizontal direction compared to the transport position of the support arms. In this context, the term horizontal direction is to be used in particular to describe a direction which lies in the plane of the support. By increasing the footprint in at least one horizontal direction, the tilting stability of the transportable machining unit can be increased during operation. This improves operational safety. At the same time, the possibility of moving the support arms into the transport position and thus reducing the footprint maintains the advantage of good transportability and manageability of a machining unit with a box-shaped support structure.

In this context, the term footprint is used in particular to describe a surface, for example a rectangular surface, which is spanned by contact points between the support structure and the support. Preferably, this is the maximum rectangular area which is spanned by the contact points.

The transportable machining unit expediently comprises at least two, preferably four, supporting arms.

Advantageous further developments of the invention are the subject matter of the dependent claims.

The support structure preferably has a base body and the support arms are mounted on the base body so as to be pivotable and/or slidable in such a way that the support arms remain essentially in the same vertical region in the transport position and in the working position.

Due to the fact that the vertical position of the support arms does not change or does not change significantly during positioning into the transport position and the working position, the transportable machining unit does not have to be lifted from its support or hardly at all during positioning of the support arms. The support arms can therefore be easily repositioned between the transport position and the working position.

The support structure has a base body and each of the support arms is mounted on the base body so that it can be pivoted about a vertical axis of rotation. The support arms are preferably mounted in such a way that they can be pivoted 90 degrees in order to be moved from the transport position to the working position. The support arms are preferably provided on the underside, i.e. on the lower outer surface of the base body. It is expedient for the base body to have recesses in which the support arms are arranged, especially in the transport position.

In the preferred embodiment, a horizontal cross-section of the support structure has a substantially rectangular outer contour, wherein the support arms are located within the rectangular outer contour in the transport position and the support arms are projecting at least partially horizontally beyond the outer contour in the working position. Preferably, the support arms in the transport position together with the base body form an essentially cuboid assembly.

The fact that the support arms are in the transport position within the rectangular outer contour ensures that the transportable machining unit can be transported and stowed particularly well.

The support arms are preferably arranged in the underside corner areas of the support structure. In particular, the base body in these corner areas has recesses which are shaped in accordance with the support arms and in which the support arms are arranged in the transport position.

In particular, the support arms each extend further in the horizontal direction than in the vertical direction, so that the support arms each have a flat basic shape. Preferably, the support arms each have an essentially L-shaped base area. Due to the flat and/or L-shaped design, the advantage is that the support arms require little installation space.

Expediently, the transportable machining unit comprises a safety device configured to prevent the drive unit from being supplied with power when at least one of the support arms is not in the working position. For example, the safety device may be designed to detect the position of one or more arms by means of sensors and to interrupt a power supply to the drive unit if it is detected that at least one, preferably all, of the support arms are not in the working position. In this way, it can be achieved that the transportable machining unit can only be put into operation if it can be assumed that the support arms are in the working position, so that the maximum footprint—and thus also the maximum tilting stability—is provided.

In particular, at least one of the support arms has a vertical through-hole suitable for inserting a screw with which the support structure can be fixed to the support. It is expedient that two, preferably all, of the arms have such a through-hole.

Preferably, at least one of the support arms has a horizontal recess suitable for inserting a clamping arm of a clamp with which the support structure can be fixed to the support. It is expedient that at least two, preferably all, of the arms have such a support.

The support arms each have a vertically downward projecting cylindrical base. The cylindrical feet are preferably spaced from each other in such a way that in the working position and/or transport position of the support arms they fit into a predetermined hole pattern of a worktop. By means of the cylindrical feet, the transportable machining unit can be fixed relative to the worktop with a hole pattern when positioned on it.

In the preferred embodiment, the cylindrical feet can be positioned either in a fixing position or in a storage position. In particular, the cylindrical feet do not project vertically downwards in the storage position or do so less vertically than in the fixing position. It is preferable for each support arm to have a stand foot which is in contact with the support when the cylindrical feet are in the storage position when the support structure is placed on the support. Preferably, the stand foot has a larger contact area than the cylindrical feet.

For example, the cylindrical feet are designed as bolts. Preferably, in the fixing position, the cylindrical feet are removably inserted into the insert openings provided on the underside of the support arms. In the storage position, it is expedient to place the cylindrical feet in storage openings, preferably on the upper side of the support arms.

An arrangement is further provided comprising a transportable machining unit according to any one of the preceding embodiments and a worktop provided with a hole pattern, wherein the transportable machining unit is positioned on the worktop such that the cylindrical feet engage in respective holes of the hole pattern and thereby fix the transportable machining unit relative to the worktop at least in the horizontal direction.

A stack assembly is further provided comprising a transportable machining unit according to any one of the preceding embodiments and at least one box-shaped body disposed below the transportable machining unit to form a vertical stack together with the transportable machining unit. It is expedient to provide engagement structures on the support arms which are designed in such a way that in the transport position of the support arms they are in engagement with corresponding engagement structures of the box-shaped body, and in the working position of the support arms they are not in engagement with corresponding engagement structures of the box-shaped body.

In this way, it can be ensured that the transportable machining unit can only be placed stably on the box-shaped body when the support arms are in the transport position. In combination with the embodiment described above, which provides for a safety device that allows the transportable machining unit to operate only in the working position, it can be ensured that the transportable machining unit cannot be accidentally switched on in a stable, stacked state in which it is to be transported.

In the preferred embodiment, the support structure has support structure coupling means which are suitable for providing a detachable, vertically tension-proof coupling with a or the at least one box-shaped body, wherein the engagement structures provided on the support arms form at least part of the support structure coupling means and are configured such that the releasable vertically tension-proof coupling can be provided when the support arms are in the transport position and are configured such that the releasable vertically tension-proof coupling cannot be provided when at least one support arm is in the working position.

Due to the vertical tension-proof coupling, the transportable machining unit can be transported particularly well in the stack. Furthermore, this embodiment, in combination with the safety device described above, can also prevent the transportable machining unit from being switched on accidentally during transport.

An exemplary embodiment is explained below with reference to the drawing. Wherein:

FIG. 3 shows a perspective representation from above onto a support arm;

FIG. 4 shows another perspective representation from above onto the support arm;

FIG. 5 shows a perspective representation from below onto the support arm;

FIG. 6 shows another perspective representation from below onto the support arm;

Figure 1:
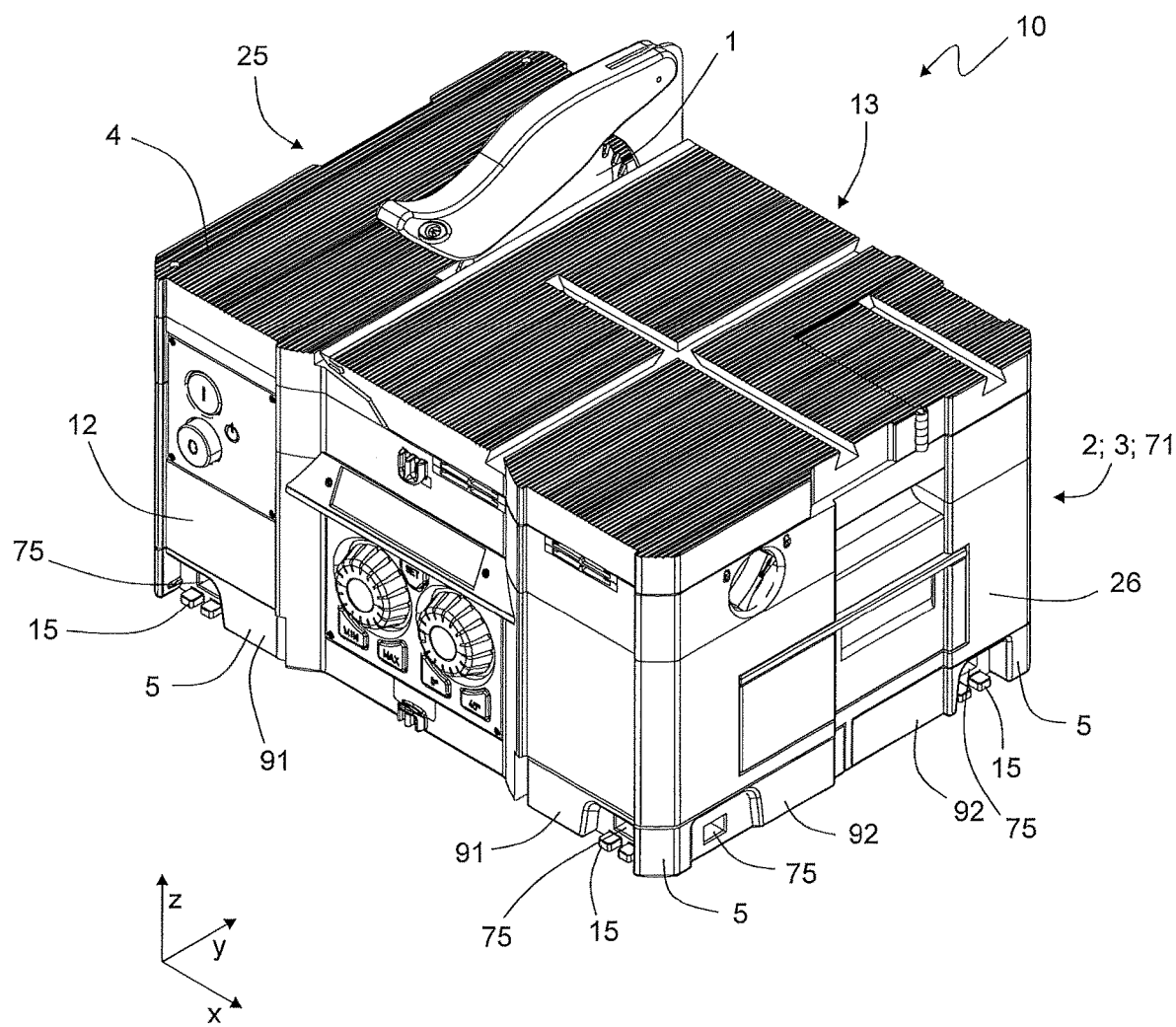
FIG. 1 shows a perspective representation of a transportable machining unit with support arms in transport position.
Figure 2:
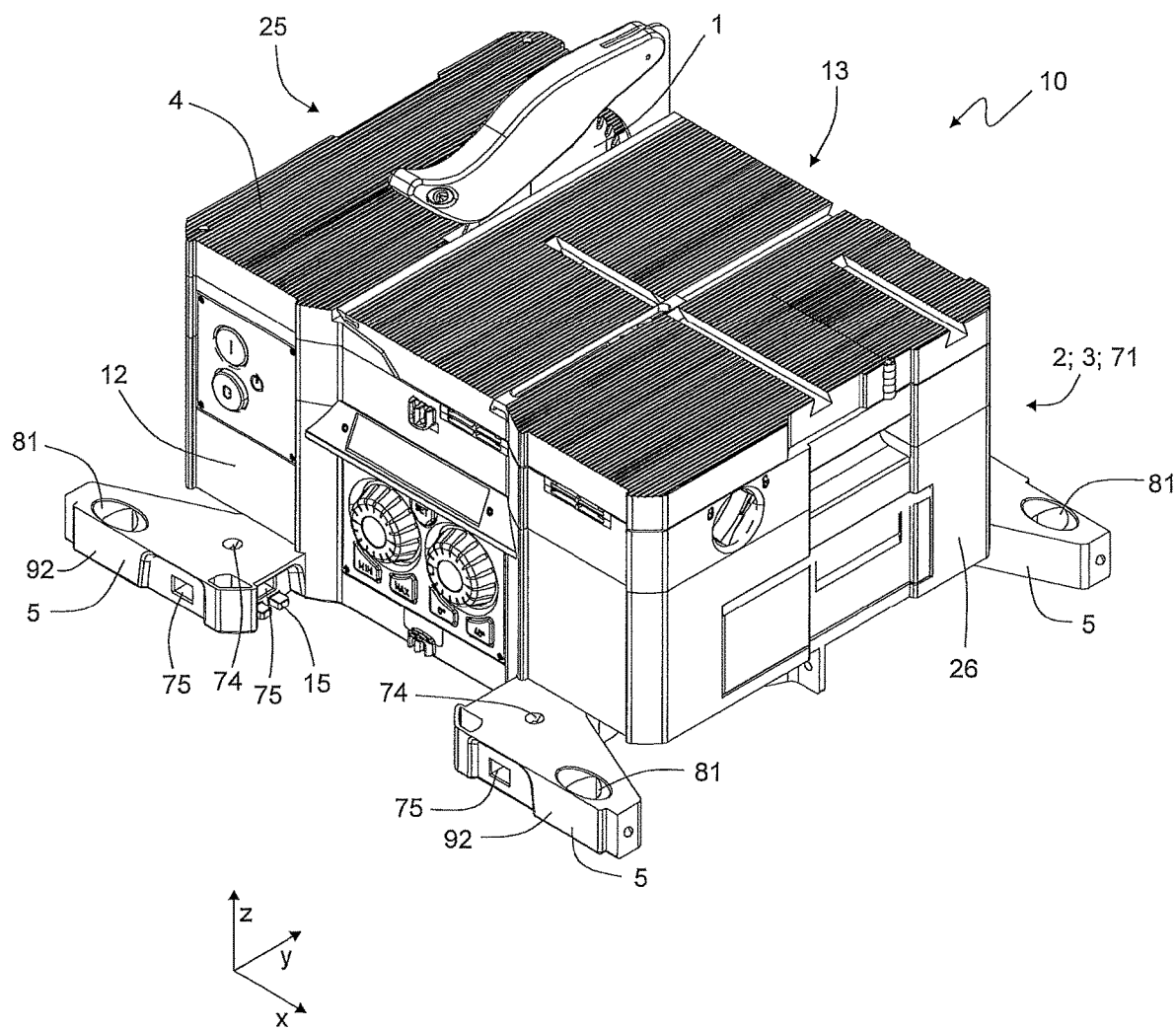
FIG. 2 shows a perspective representation of the transportable machining unit with support arms in working position.

FIGS. 1 and 2 show perspective representations of a transportable machining unit 10, which has support arms 5 to increase its footprint. FIG. 1 shows the support arms 5 in a transport position, while FIG. 2 shows the support arms in a working position.

The transportable machining unit 10 extends in a vertical direction parallel to the z-axis drawn in the figures, in a longitudinal direction parallel to the x-axis drawn in the figures, and in a transverse direction parallel to the y-axis drawn in the figures. The x-axis, y-axis and z-axis are orthogonal to each other. The longitudinal and transverse directions are hereinafter also referred to as the horizontal directions.

The transportable machining unit 10 in the drawings is exemplarily designed as a circular table saw. Alternatively, the transportable machining unit 10 can also be designed as another semi-stationary machine, such as a router, scroll saw or edge grinder. In this context, a semi-stationary machine is defined in particular as a machining unit which is placed on a support during workpiece machining and which can be carried by one person during transport.

The transportable machining unit 10 is used to machine a part not shown in the figures with a tool 1. The tool 1 in the figures is exemplarily designed as a saw blade.

The transportable machining unit 10 comprises a box-shaped support structure 2 which can be placed on a support and which has a workpiece support plate 4 which can be used to place the workpiece to be machined. The box-shaped support structure 2 is an essentially cuboid structure in which the outer surfaces, preferably all outer surfaces, are essentially closed.

Furthermore, the transportable machining unit 10 includes a drive unit 73, for example an electric motor, for the mechanical drive of the tool 1. In the example discussed, the drive unit 73 is completely arranged in the support structure 2 and fastened to the support structure 2 ready for operation, so that the drive unit remains in the support structure 2 when the workpiece is machined by the tool 1 driven by the drive unit 73.

The support structure 2 has support arms 5. In a state where the support structure 2 is placed on the support, the support arms 5 define a footprint for the support structure 2.

The support arms can be positioned either in a transport position or in a working position. The footprint of the support structure 2 is larger in at least one horizontal direction in the working position than in the transport position.

The tilting stability of the transportable machining unit 10 can be increased during operation by increasing the footprint in at least one horizontal direction. This improves operational safety.

Exemplary configurations of the transportable machining unit 10 are explained in detail below.

The support structure 2 is box-shaped and has four circumferential walls aligned orthogonally to each other. The circumferential walls comprise a front wall 12, a rear wall 13, as well as side walls 25 and 26. The front wall 12 and the rear wall 13 are aligned parallel to the longitudinal direction, and the side walls 25, 26 are aligned parallel to the transverse direction.

The support structure 2 has a base body 71 on which support arms 5 are mounted. The combination of base body 71 and support arm 5 is hereinafter also referred to as the lower part 3 of the support structure 2.

The support structure 2 has four support arms 5 arranged in the underside corner areas of the support structure 2. The support structure 2 has an essentially cuboid basic shape. In the transport position, the four arms 5 represent the lower four corner areas of the cuboid basic shape. The base body 71 has corresponding recesses in which the four support arms 5 are arranged in the transport position in order to form the lower four corner areas of the cuboid basic shape of the support structure 2. In the working position, the support arms 5 are only partially arranged in the recesses.

A horizontal cross-section of the support structure 2 has an essentially rectangular outer contour. In the transport position, the support arms 5 are located within the rectangular outer contour. In the working position, the support arms 5 project at least partially horizontally beyond the outer contour.

The support arms 5 are each mounted on the base body 71 so that they can be pivoted about a vertical axis of rotation. The support arms 5 are mounted on the underside of the base body 71 on downward facing surfaces of the recesses of the base body 71. Due to the pivoting bearing around a vertical axis, the support arms 5 in the transport position and in the working position remain essentially in the same vertical range. The support arms 5 thus occupy essentially the same coordinate range in the z-direction in the working position as well as in the transport position.

FIGS. 3 to 6 show a support arm 5 in detail. FIGS. 3 and 4 show the support arm 5 diagonally from above and FIGS. 5 and 6 diagonally from below. The support arm 5 shown is the support arm 5, which is arranged on the front right in FIG. 1—i.e. in the lower corner area between the front surface 12 and the side surface 26. The support arm 5 arranged on the front left in FIG. 1 is designed as a mirroring of the support arm 5 arranged on the front right (e.g. on a y-z mirror plane).

The support arm 5 shown in FIGS. 3 to 6 has a flat basic shape; i.e. it extends further in the horizontal direction or the x-direction and/or y-direction than in the vertical direction or z-direction.

The support arm 5 is essentially in the form of a prism or general cylinder with an L-shaped base area. The support arm 5 has a first arm section 83 and a second arm section 84 which are orthogonal to each other and together form an L-shape.

The support arm 5 has an L-shaped upper wall 85 and an L-shaped lower wall 86. The upper and lower walls 85, 86 are aligned horizontally. The support arm 5 also has a jacket surface 87, which is divided into a convex and a concave section 88, 89. The convex section 88 has first and second side walls 91, 92 orthogonal to each other. The first side wall 91 is assigned to the first arm section 83 and the second side wall 92 to the second arm section 84.

As shown in FIG. 1, the first side wall 91 in the transport position of the front right support arm 5 forms part of the front wall 12 of the support structure 2 and the second side wall 92 forms part of the side wall 26 of the support structure 2.

The support arm 5 has a bearing component 93 on its upper wall 85 at a distal end of the first arm section 83 with which it is attached to the base body 71 pivotable about a vertical axis.

The support arm 5 can be pivoted about the vertical axis by about 90 degrees in order to be positioned from the transport position into the working position. In the working position, the second side wall 92 is arranged parallel to the front wall 12 and is located transversely in front of the front wall 12.

As can be seen in FIGS. 5 and 6, the support arm 5 has on its lower wall 86, in the area where the two arm sections 83 and 84 converge, an engagement structure 82 which is designed as a stand foot and which is formed as a flat projection downwards. The lower surface 94 of the engagement structure 82 provides a contact surface between the support arm 5 and a support on which the transportable machining unit 10 is placed.

The support arm 5 has a vertical through-hole 74. The through-hole 74 runs from the upper wall 85 to the lower surface 94 of the engagement structure 82. The through-hole 74 is suitable for inserting a screw with which the support structure 2 can be fixed on a support.

The support arm 5 also has a horizontal recess 75. The recess 75 has a rectangular cross-section and opens out at the second side wall 92. The recess 75 is suitable for inserting a clamping arm of a clamp with which the support structure 2 can be fixed to the support. The recess 75 runs over the engagement structure 82. As can be seen in FIG. 1, the support arm may also have a recess 75 which opens out at the first side wall 91.

The support arm 5 also has a cylindrical foot 76 which projects vertically downwards.

In the example shown, the cylindrical foot 76 is designed as a bolt 78.

The bolt 78 can be positioned either in a fixing position or in a storage position. FIG. 3 shows the bolt 78 in the storage position and FIG. 6 in the fixing position. In the fixing position, the bolt 78 is removably inserted in an insertion opening 79 provided on the underside of the support arm 5. In the storage position, the bolt 78 is accommodated in a storage opening 81 provided on the upper side of the support arm 5. In the storage position, the cylindrical feet 76 do not project vertically downwards.

In the example shown, the insertion opening 79 and the storage opening 81 belong to the same through-hole. In this through-hole and on the bolt 78, as shown, corresponding ring shoulders may be provided which provide a vertical form locking and thus prevent the bolt 78 from falling out of the through-hole or slipping upwards.

As explained above, the support arm 5 arranged in the front left of FIG. 1 is a mirroring of the support arm 5 arranged in the front right.

Figure 11:
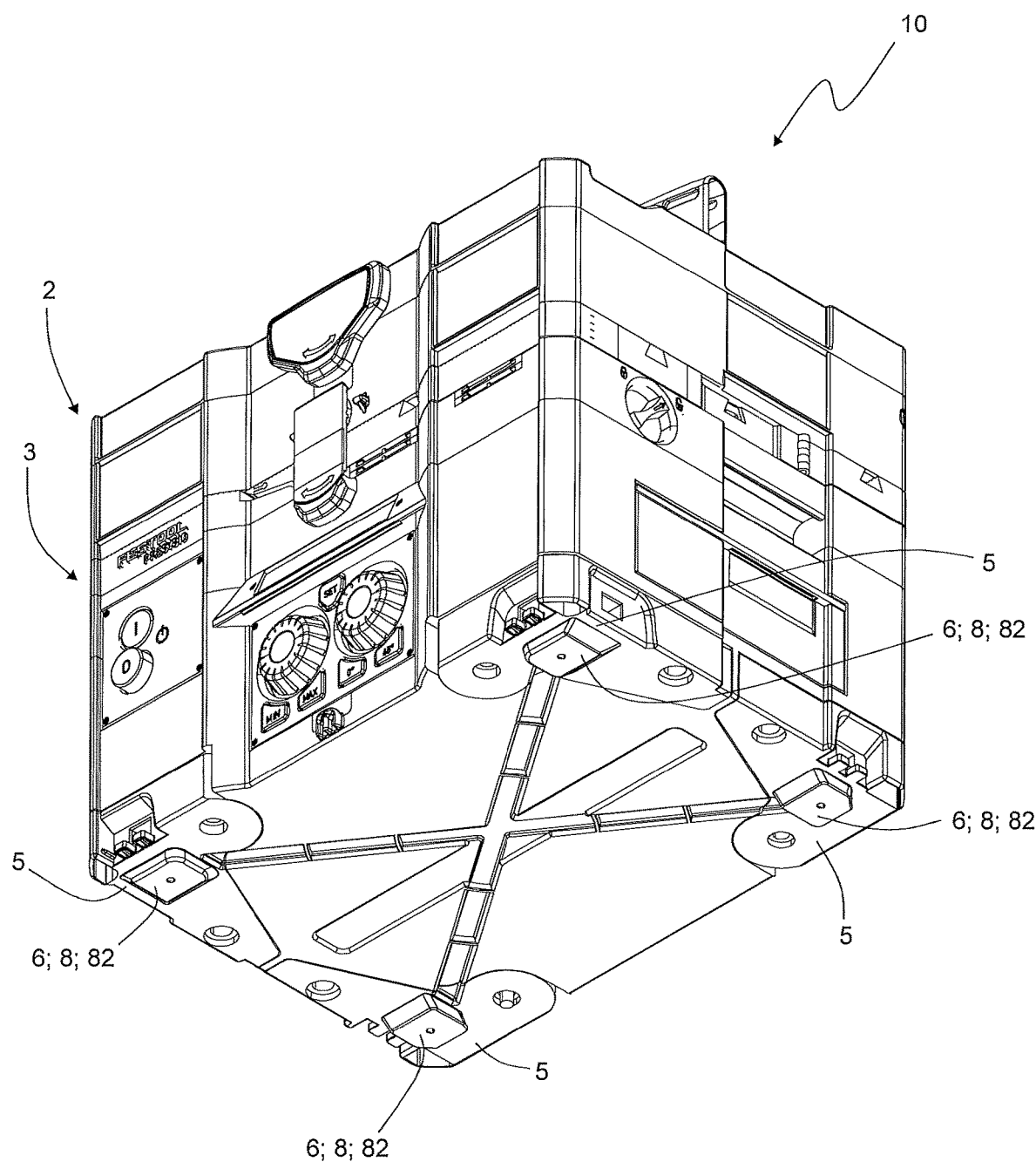
FIG. 11 shows a perspective representation of a transportable machining unit from below.

The support arm 5, which is not visible in the figures and is arranged at the rear left, has the features discussed above in connection with the support arm 5, which is arranged at the front right, but differs from this in particular in that, as explained below, the engagement structure 82 of the support arm 5, which is designed as a stand foot, has a profiled, for example wedge-shaped profiled reach-behind section. FIG. 11 shows the engagement structures 82 of the front and rear support arms 5.

Furthermore, the support arm 5 at the rear left differs from the support arm 5 at the front right in that the second locking anchor contours 15 explained below are not provided on the first side wall but on the second side wall.

The support arm 5 at the rear right is designed as a mirroring of the support arm at the rear left.

Figure 7:
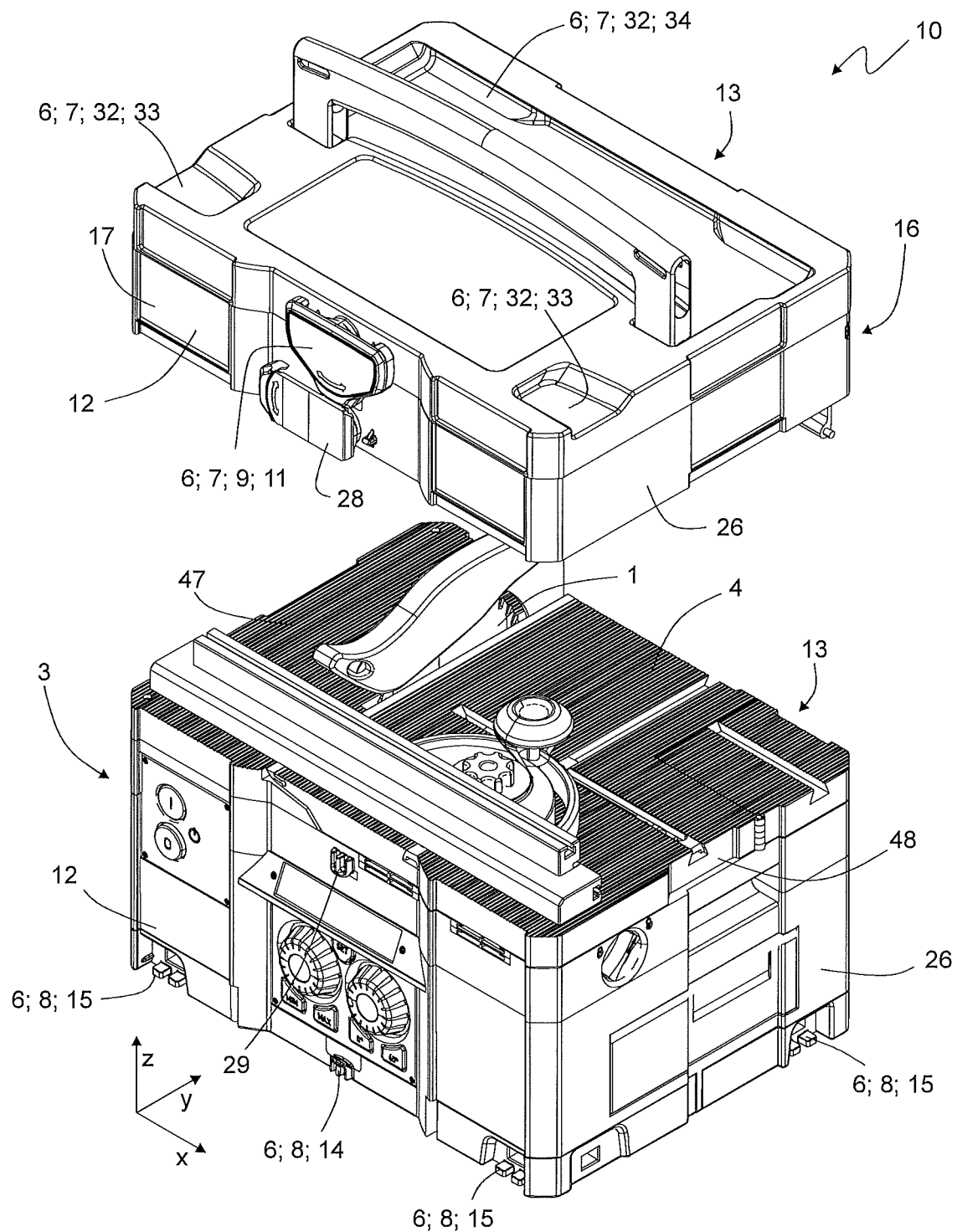
FIG. 7 shows a perspective representation of a transportable machining unit with upper part.

FIG. 7 shows a transportable machining unit 10 in which the support structure 2 has, in addition to the lower part 3, an upper part 16 that can be placed on the lower part 3. As explained below, the upper part 16 is used in particular to accommodate the transportable machining unit 10 in a stack of box-shaped bodies in a vertically tension-proof manner.

The support structure 2 has support structure coupling means 6. The support structure coupling means 6 are adapted to provide a releasable, vertically tension-proof coupling with the box-shaped bodies 21, 22 in a state shown in FIG. 8 in which the support structure 2 forms a vertical stack together with box-shaped bodies 21, 22.

The transportable machining unit 10 can be stably accommodated in a stack of box-shaped bodies, such as box-shaped containers and/or other transportable machining units 10, due to the support structure coupling means 6. The transportable machining unit 10 can therefore be very conveniently stowed in the stack and/or transported safely.

As can be seen in the figures, the transportable machining unit 10 has in particular the basic shape of a system casing. The transportable machining unit 10 shown in the drawings is designed to be accommodated in a stack of further system casings. The basic shape of the transportable machining unit is defined in particular by the box-shaped support structure. The outer surfaces of the support structure preferably represent the housing or the outer housing surfaces of the transportable machining unit 10. The housing or the basic shape of the transportable machining unit has the shape of a system casing in particular. System casings of a system have a base area defined in the system and have coupling means defined in the system so that system casings of a system can be assembled into a stable stack. System casings are widely used, for example, as modular tool boxes for storing hand-held power tools, accessories and/or consumables. If the basic shape or the housing of the machining unit according to the invention is in the form of a system casing, the transportable machining unit can be conveniently stowed and transported in a stack of system casings.

Figure 8:
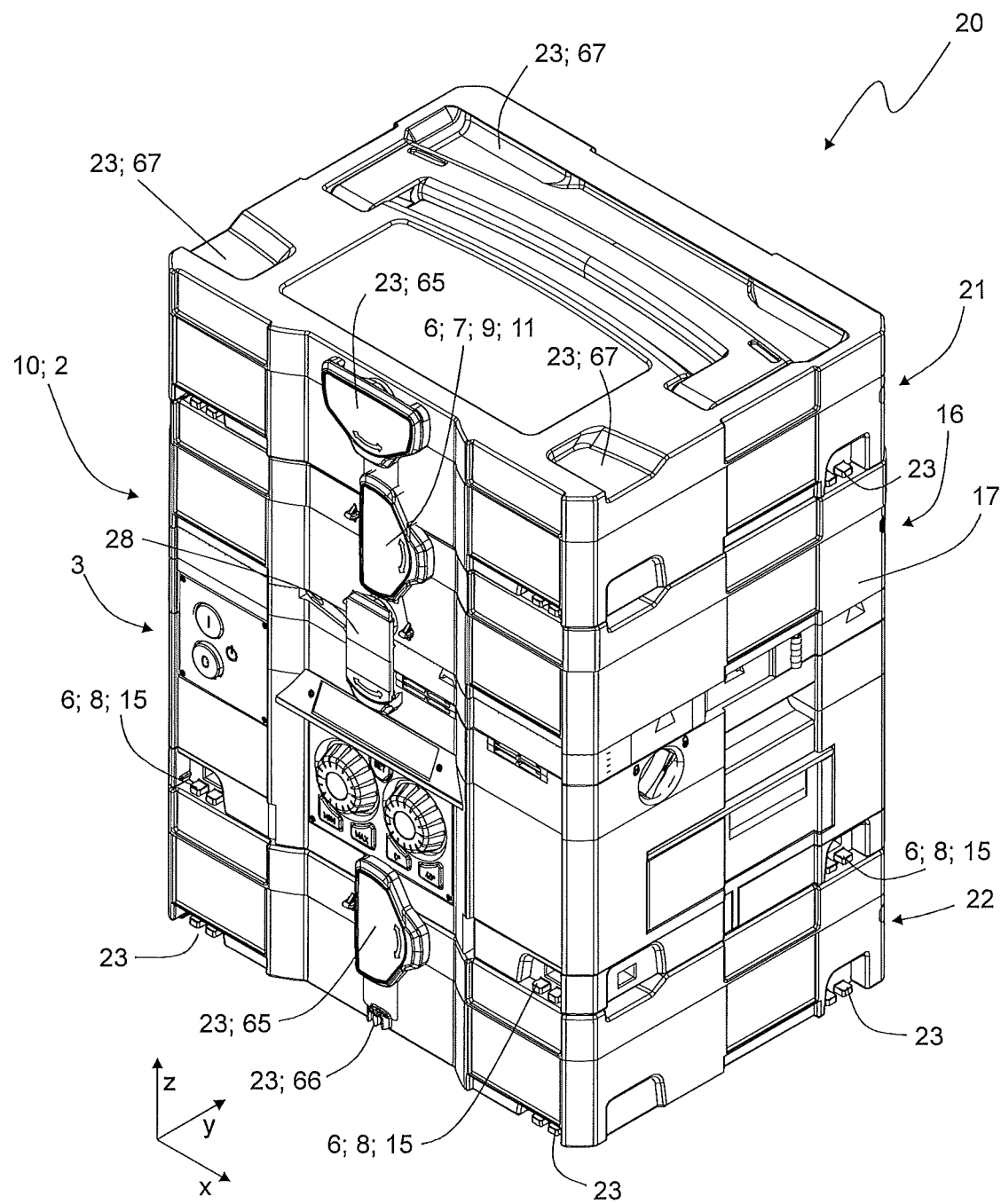
FIG. 8 shows a perspective representation of a stack arrangement comprising the transportable machining unit and two box-shaped containers.

As mentioned above, the support structure 2 has the upper part 16 which can be detachably attached to the lower part 3. FIG. 7 shows the machining unit 10 in a state in which the upper part 16 is detached from the lower part 3. In FIG. 8, the upper part 16 is placed on the lower part 3 and coupled vertically to it in a tension-proof manner.

The support structure coupling means 6 comprise upper support structure coupling means 7 provided on the upper part 16. The support structure coupling means 7 are adapted to provide a releasable, vertically tension-proof coupling to the box-shaped body in a state in which a box-shaped body 21 is stacked on the transportable machining unit 10. The upper support structure coupling means 7 comprise a movably mounted locking element 9. In the example shown, the locking element 9 comprises a rotary latch 11 rotatably supported on the support structure 2. The rotary latch 11 is arranged on the front wall 12 of the support structure 2. The axis of rotation of the rotary latch 11 is orthogonal to the front wall 12.

The support structure coupling means 6 further comprise lower support structure coupling means 8 provided on the lower part 3. The lower support structure coupling means are adapted to provide a releasable, vertically tension-proof coupling to the box-shaped body 22 in a state in which the transportable machining unit 10 is stacked on a box-shaped body 22. The lower support structure coupling means 8 comprise at least one first locking anchor contour 14 non-movably arranged on the support structure 2. In the example shown, the first locking anchor contour 14 is arranged on the lower part of the support structure 2. The first locking anchor contour 14 is located on the front wall 12 of the support structure and is arranged centrally on the support structure 2 in relation to the longitudinal direction. The first locking anchor contour 14 is designed as a locking projection and projects from the front wall 12.

The locking element 9 and the first locking anchor contour 14 are arranged in such a way that when two transportable machining units 10 are stacked vertically one above the other, the locking element 9 of one transportable machining unit can be brought into coupling engagement with the first locking anchor contour 14 of the other machining unit.

In the example shown, the lower support structure coupling means 8 have second locking anchor contours 15 in addition to the first locking anchor contour 14. The second locking anchor contours 15 are designed as locking projections and are arranged on the first side walls 91 of the front support arms 5 and on the second side walls of the rear support arms 5. In the transport position, the second locking anchor contours 15 are thus arranged in the lower corner areas of the front wall 12 and in the lower corner areas of the side walls 25 and 26 located at the rear wall 13.

The second locking anchor contours 15 are used to connect the transportable machining unit 10 to containers or other objects that have locking elements complementary to the second locking anchor contours 15. If it is not provided that the transportable machining unit 10 is also to be coupled to such containers or objects, the second locking anchor contours 15 can also be dispensed with.

The upper support structure coupling means 7 further comprises a plurality of engagement structures distributed on the upper surface of the support structure 2 and formed as engagement recesses 32. The engagement recesses 32 comprise two first engagement recesses 33 arranged near the front wall 12 and a second engagement recess 34 arranged near the rear wall 13.

The lower support structure coupling means 8 comprise the above-mentioned engagement structures 82, which are arranged on the lower wall 86 of the support arms 5 and are therefore in the transport position in the four corner areas of the underside of the support structure 2. The engagement structures 82 and the engagement recesses 33, 34 are arranged in such a way that with two transportable machining units 10 stacked vertically one above the other, the engagement structures 82 of the upper transportable machining unit are in engagement with the engagement recesses 32 of the lower machining unit, provided that the support arms 5 are in the transport position.

The engagement structures 82 and the engagement recesses 32 contribute to the vertical coupling. This can be done by interlocking engagement of the reach-behind components of the engagement structures 82 and/or engagement recesses 32, as described in detail in EP2315701B1, for example. For example, the second engagement recess 34 may have an undercut cross-section and the corresponding engagement structures 82 reaching into the second engagement recess 34 may have a correspondingly profiled, for example wedge-shaped profiled reach-behind section, as shown, for example, in FIG. 11.

The upper part 16 of the support structure 2 is designed as a hood-shaped cover. In the state shown in FIG. 8, the upper part 16 covers the tool support plate 4. The upper part 16 comprises a frame structure 17 extending vertically upwards over the workpiece support plate 4. The horizontal cross-section of the upper part 16 or the frame structure 17 has essentially the same outer contour as the horizontal cross-section of the lower part 3. The upper part 16 is aligned with the lower part 3, so that together with the lower part 3 it forms the box-shaped support structure 2.

As shown in FIG. 7, the frame structure 17 essentially has the shape of a cuboid jacket surface; i.e. the frame structure 17 has four orthogonally aligned circumferential walls and has an open underside and an open upper side.

The frame structure 17 extends vertically upwards beyond the tool 1 attached to the drive unit. In this way, the tool 1 can remain attached to the drive unit 5 even if the transportable machining unit 10 is arranged in a stack.

The upper part 16 has upper part coupling means 28 and the lower part 3 has lower part coupling means 29. With the aid of the upper part coupling means 28 and the lower part coupling means 29, the upper part 16 can be detachably coupled to the lower part 3 in a vertically tension-proof manner.

The upper side of the workpiece support plate 4 is provided with grooves in the example shown. Alternatively, the upper side of the workpiece support plate 4 can also be provided without grooves or even or with a different structure.

The saw blade lies on an imaginary line running in the transverse direction which divides the workpiece support plate 4 in the longitudinal direction into two plate sections 47 and 48. Preferably, the first plate section 47 is fixed relative to the tool 1, while the second plate section 48 is mounted so as to be displaceable at least in the transverse direction so that it can be displaced relative to the tool 1 in the transverse direction. With the movable second plate section 48, a workpiece can be guided or moved relative to the tool 1 during machining.

Particularly when the panel section 48 is extended, the larger footprint achievable with the pivotable support arms 5 and the associated improved tilting stability are advantageous.

FIG. 8 shows an example of how the transportable machining unit 10 is arranged in a stack with two further box-shaped bodies 21, 22.

The stack arrangement 20 shown in FIG. 5 comprises the transportable machining unit 10 discussed above, an upper box-shaped body 21 arranged on the transportable machining unit 10, and a lower box-shaped body 22 arranged below the transportable machining unit 10. The two box-shaped bodies 21, 22 in FIG. 8 are exemplarily designed as box-shaped containers. Alternatively, each of the box-shaped bodies 21, 22 can also be designed as an additional machining unit 10.

The two box-shaped bodies 21, 22 together with the transportable machining unit 10 form a vertical stack. The box-shaped bodies 21, 22 have body coupling means 23 which cooperate with the support structure coupling means 6 to provide a releasable, vertically tension-proof coupling between the box-shaped bodies 21, 22 and the transportable machining unit 10.

The horizontal cross-section of the transportable machining unit 10 has essentially the same outer contour as the horizontal cross-section of the box-shaped bodies 21, 22. The transportable machining unit 10 is arranged in alignment with the box-shaped bodies 21, 22, so that the transportable machining unit 10 and the box-shaped bodies 21, 22 together form an essentially cuboid stack.

The body coupling means 23 may be identical to the support structure coupling means 6. The coupling between the body coupling means 23 and the support structure coupling means 6 can then be carried out in the same way as the coupling described above between support structure coupling means 6 of two transportable machining units 10.

In particular, the body coupling means 23 comprise a locking element 65, preferably in the form of a rotary latch, a locking anchor contour 66, and engagement structures 67.

FIG. 8 shows the locking anchor contour 66 of the upper box-shaped body 21, placed on the transportable machining unit 10, in coupling engagement with the locking element 9 of the transportable machining unit 10 The locking anchor contour 14 of the transportable machining unit is in coupling engagement with the locking element 65 of the lower box-shaped body 22.

Furthermore, the upper box-shaped body 21 has engagement structures on its underside which correspond to the above-mentioned engagement structures 82 of the transportable machining unit 10 and which engage in the engagement recesses 32 of the transportable machining unit. Furthermore, the lower box-shaped body 22 has engagement recesses on its upper side which correspond to the above-mentioned engagement recesses 32 of the transportable machining unit 10 and which engage the engagement structures 82 of the transportable machining unit 10.

As the engagement structures 82 are provided on the support arms 5, the engagement structures 82 change their position relative to the engagement recesses of the lower box-shaped body 22, when the support arms 5 are positioned. The engagement structures 82 can only be brought into engagement with the corresponding engagement recesses of the box-shaped body 22 in the transport position. In the working position of the support arms 5 it is not possible to bring the engagement structures 82 into engagement with the corresponding engagement recesses of the box-shaped body 22.

As already described above, the engagement structures and recesses are also involved in the vertical tension-proof coupling. Due to the fact that the engagement structures 82 are provided on the support arms 5, the detachable, vertical tension-proof coupling can only be provided if the support arms 5 are in the transport position. The detachable, vertical tension-proof coupling cannot be provided if at least one support arm 5 is in the working position.

Figure 9:
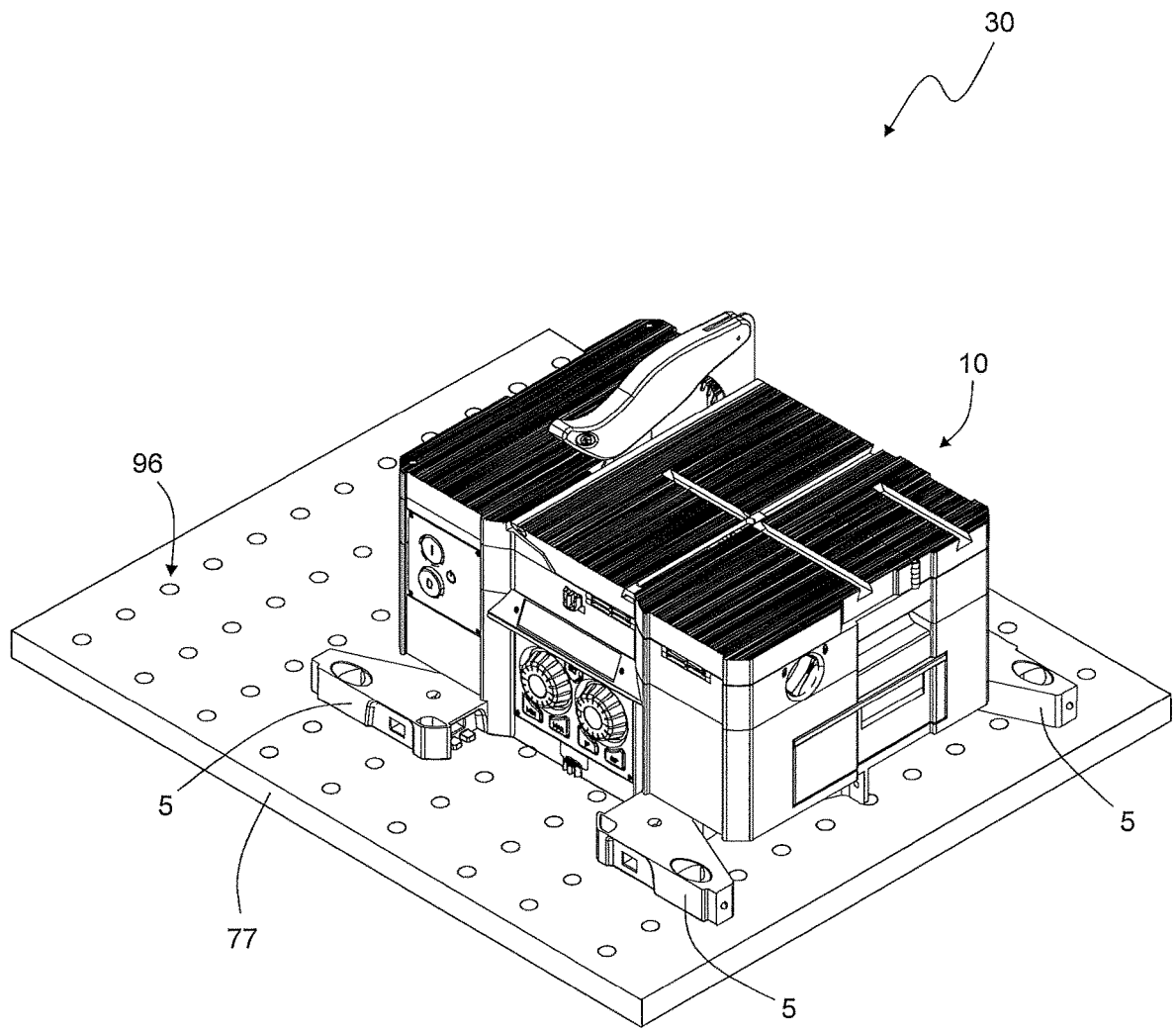
FIG. 9 shows a perspective representation of a structure consisting of a transportable machining unit and a worktop with a hole pattern.

FIG. 9 shows an arrangement 30 comprising a transportable machining unit 10 and a worktop 77 with a hole pattern 96. The transportable machining unit 10 is positioned on the worktop 77 in such a way that the cylindrical feet 76 engage in respective holes of the hole pattern 96 and thus fix the transportable machining unit 10 relative to the worktop 77 at least in the horizontal direction. The hole pattern 96 is exemplarily matrix-shaped.

Figure 10:
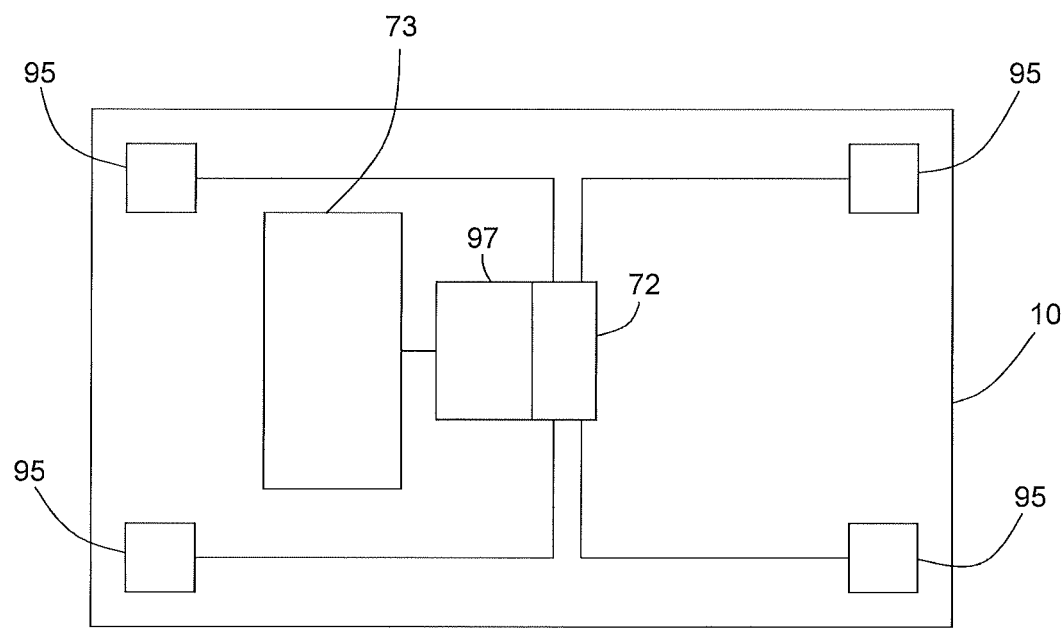
FIG. 10 shows a schematic block diagram of a transportable machining unit.

FIG. 10 shows a schematic block diagram of the transportable machining unit 10. For the sake of clarity, FIG. 10 does not show all the components of the transportable machining unit 10, but only those components that are explained below.

The transportable machining unit 10 comprises control electronics 97, which are used to control the drive unit 73. The transportable machining unit 10 also includes a safety device 72, which is, for example, a component of the control electronics 97. The safety device 72 can in particular be designed as a hardware component and/or software component. The transportable machining unit 10 also includes position sensors 95, which are designed to detect whether the support arms 5 are in the working position. In the example shown, the transportable machining unit comprises four position sensors 95, wherein each position sensor 95 is assigned to one support arm 5. Alternatively, it is also possible that a separate position sensor 95 is not provided for each support arm 5. For example, only one position sensor 95 may be provided. In this case, the support arms 5 can be mechanically coupled to each other so that they can only be moved into the working position and/or the transport position together, and therefore the positions of the other support arms 5 can be inferred from the detected position of one support arm 5.

The safety device 72 receives the detected positions of the support arms 5 from the position sensors 95. The safety device 72 is designed to prevent the drive unit 73 from being supplied with power if at least one of the support arms 5 is not in the working position.

For example, the safety device 72 is designed to set the control electronics 97 to a state in which they do not supply the drive unit with power if at least one of the support arms 5 is not in the working position. This can be done, for example, by storing appropriate information in the software and/or by opening or closing a switch in the hardware.

The invention claimed is:

1. Transportable machining unit for machining a workpiece with a tool, comprising a box-shaped support structure which can be placed on a support and which box-shaped support structure has a workpiece support plate which workpiece support plate can be used to support the workpiece to be machined, and a drive unit for mechanically driving the tool, which drive unit is arranged at least partially in the support structure and is fastened thereto ready for operation, so that the drive unit remains at least partially in the support structure during machining of the workpiece by the tool driven by the drive unit, wherein the support structure has support arms which, in a state, in which the support structure is placed on the support, define a footprint of the support structure, and which can be positioned selectively in a transport position or in a working position, wherein the footprint of the support structure is larger in the working position in at least one horizontal direction than in the transport position, the transportable machining unit further including one or more position sensors for detecting whether the support arms are in the working position, the transportable machining unit further comprising control electronics for controlling the drive unit, the control electronics comprising a safety device configured to receive detected positions of the support arms from the position sensors and to prevent the drive unit from being supplied with power if at least one of the support arms is not in the working position, wherein the safety device is configured to set the control electronics to a state in which they do not supply the drive unit with power if at least one of the support arms is not in the working position.

2. Transportable machining unit according to claim 1, wherein the support structure has a base body and the support arms are mounted on the base body so as to be pivotable and/or displaceable in such a way that the support arms remain essentially in the same vertical region in the transport position and in the working position.

3. Transportable machining unit according to claim 1, wherein the support structure has a base body and each of the support arms is mounted on the base body so as to be pivotable about a respective vertical axis of rotation.

4. Transportable machining unit according to claim 1, wherein a horizontal cross-section of the support structure has a substantially rectangular outer contour, wherein the support arms are located within the rectangular outer contour in the transport position and the support arms project at least partially horizontally beyond the outer contour in the working position.

5. Transportable machining unit according to claim 1, wherein the support arms are arranged in underside corner regions of the support structure.

6. Transportable machining unit according to claim 1, wherein the support arms each extend further in the horizontal direction than in the vertical direction, so that the support arms each have a flat basic shape.

7. Transportable machining unit according to claim 1, wherein at least one of the support arms has a vertically extending through-hole suitable for inserting a screw with which the support structure can be fixed on the support.

8. Transportable machining unit according to claim 1, wherein at least one of the support arms has a horizontally extending recess suitable for inserting a clamping arm of a clamp with which the support structure can be fixed on the support.

9. Transportable machining unit according to claim 1, wherein the support arms each have a first arm section, a second arm section, and a cylindrical foot projecting vertically downwardly from the second arm section.

10. Transportable machining unit according to claim 9, wherein the cylindrical feet can be selectively positioned in a fixing position or storage position, wherein the cylindrical feet project downwards in the storage position not at all or less vertically than in the fixing position.

11. Transportable machining unit according to claim 10, wherein the cylindrical feet are constructed as bolts which, in the fixing position, are removably inserted in insertion openings provided on the underside of the support arms and, in the storage position, are accommodated in storage openings provided on the upper side of the support arms.

12. Transportable machining unit according to claim 1, wherein the support structure has a base body and each of the support arms is mounted on the base body so as to be pivotable about a respective vertical axis of rotation.

13. Transportable machining unit according to claim 1, wherein a horizontal cross-section of the support structure has a substantially rectangular outer contour, wherein the support arms are located within the rectangular outer contour in the transport position and the support arms project at least partially horizontally beyond the outer contour in the working position.

14. Transportable machining unit according to claim 1, wherein the support arms are arranged in underside corner regions of the support structure.

15. Transportable machining unit according to claim 1, wherein the support arms each extend further in the horizontal direction than in the vertical direction, so that the support arms each have a flat basic shape.

16. Transportable machining unit according to claim 1, wherein the support arms each have a first arm section, a second arm section, and a cylindrical foot projecting vertically downwardly from the second arm section.

17. Transportable machining unit according to claim 1, wherein each support arm has a lower wall, from which an engagement structure projects downwards.

18. Transportable machining unit according to claim 17, further comprising engagement recesses provided on an upper surface of the support structure, wherein the engagement structures and the engagement recesses are arranged such that with the transportable machining unit stacked on an identical transportable machining unit, the engagement structures of the transportable machining unit are in engagement with the engagement recesses of the identical transportable machining unit, provided that the support arms of the transportable machining unit are in the transport position.

19. Transportable machining unit according to claim 18, wherein each engagement structure is designed as a stand foot.

20. Transportable machining unit according to claim 17, wherein each support arm has an upper wall and the lower wall which are aligned horizontally and are L-shaped so that each support arm has an L-shaped base area, wherein each support arm has a first arm section and a second arm section which are orthogonal to each other and together form the L-shape of the support arm, wherein the engagement structure is arranged at an area where the first arm section and the second arm section converge.

21. Transportable machining unit according to claim 20, wherein each support arm has a bearing component on its upper wall at a distal end of the first arm section, with which bearing component the support arm is attached to a base body pivotable about a vertical axis.

22. Transportable machining unit according to claim 1, wherein each support arm has an upper wall and a lower wall which are aligned horizontally and are L-shaped so that each support arm has an L-shaped base area.

23. Arrangement comprising a transportable machining unit according to claim 9 and a worktop provided with a hole pattern, wherein the transportable machining unit is positioned on the worktop such that the cylindrical feet engage in respective holes of the hole pattern and thereby fix the transportable machining unit relative to the worktop at least in a horizontal direction.

24. Stack assembly comprising the transportable machining unit according to claim 1 and a box-shaped body arranged below the transportable machining unit to form a vertical stack together with the transportable machining unit, wherein engagement structures are provided on the support arms, which are designed such that in the transport position of the support arms they are in engagement with corresponding engagement structures of the box-shaped body and in the working position of the support arms they are not in engagement with the corresponding engagement structures of the box-shaped body.

25. Stack assembly according to claim 24, wherein the support structure has support structure couplers adapted to provide a releasable vertical tension-proof coupling to the at least one box-shaped body, wherein the engagement structures provided on the support arms form at least a portion of the support structure couplers and being so formed, in that the detachable, vertically tension-proof coupling can be provided if the support arms are in the transport position and the detachable, vertically tension-proof coupling cannot be provided if at least one support arm is in the working position.

* * * * *